Patented Mar. 26, 1940

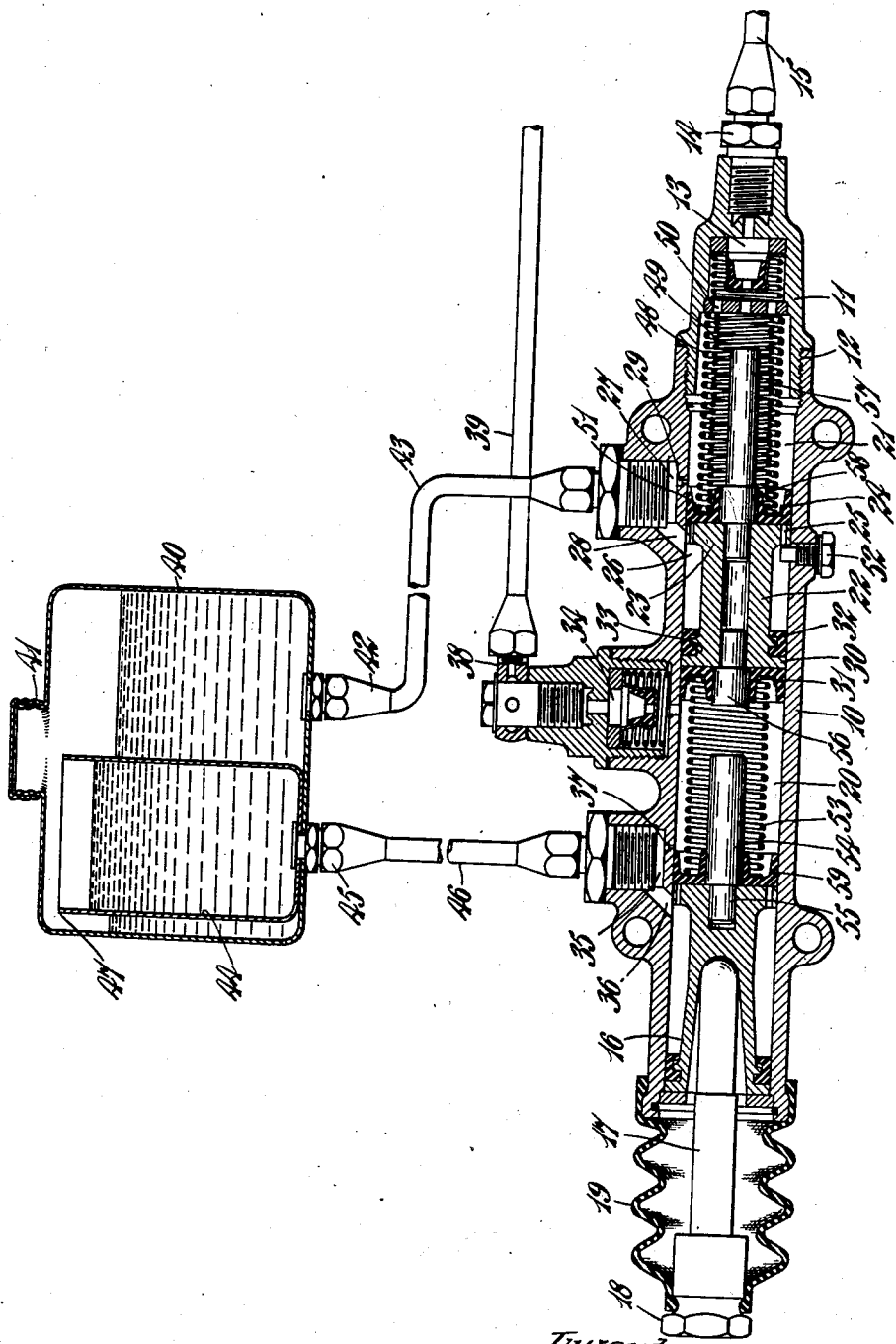

2,194,816

UNITED STATES PATENT OFFICE 2,194,816

MASTER CYLINDER FOR HYDRAULIC BRAKE SYSTEMS

Geoffrey Van Vestraut and Frank Gordon Parnell, London, England, assignors to Automotive Products Company Limited, London, England Application September 18, 1935, Serial No. 41,162
In Great Britain March 21, 1935

1 Claim. (Cl. 60—54.6)

This invention relates to controlling systems actuated by hydraulic pressure, such for example as are used in conjunction with vehicle brakes, aircraft controls and hydraulic controlling mechanism generally.

It is the object of the present invention to provide an improved construction of tandem master cylinder unit of the known general form consisting of a cylinder barrel the working space within which is bounded by an externally actuated master piston and is divided into a plurality of separate compartments by one or more floating pistons, said compartments being fed with liquid from a supply reservoir and being each arranged to deliver said liquid under pressure to one of a number of independent hydraulic systems. In operation, the pressure created in the first compartment by movement of the master piston is not only transmitted to the system connected with said compartment but also acts upon the first of the floating pistons and thus creates pressure in the second compartment, and so on, if there is more than one floating piston. It will be appreciated that in the event of a leakage developing in the system connected with any one of the compartments it will no longer be possible to create the normal pressure in any of the compartments owing to the equalization of pressure which takes place, and it is this difficulty which the present invention sets out to avoid.

In the improved arrangement the movement of the floating piston within the cylinder barrel is positively limited by the co-engagement of rigid abutments upon the master piston, upon the floating piston or pistons and upon the head portion of the cylinder barrel, whereby the axial approach of the members forming the end walls of each individual working space is limited so as not to exceed a predetermined distance. Thus, the axial projections carried by the floating and master pistons may co-operate to limit the permissible reduction in the volume of each working space, and to provide a mechanical operating bridge across any working space becoming deficient in pressure resistance, for example due to breakage of a pipe line and consequent leakage of fluid. The projections are preferably removable from the pistons so as to be interchangeable for adjusting the maximum permissible displacement volume of each working space. Moreover, each floating piston preferably comprises a body greater in length than its diameter and provided at its head with a piston cup packing arranged to resist the axial flow of liquid in only one direction, and at its tail, packing means resisting liquid flow in both directions, said head and tail parts preferably being arranged to fit slidably in the cylinder barrel, but the intermediate part being cut away or otherwise reduced in size so as to form a passage co-operating with an inlet passage feeding one of the adjacent working spaces. The intermediate part of the floating piston may, if desired, be formed with an annular groove which is engaged by a stop extending radially into the cylinder barrel for limiting the axial return movement of the floating piston.

One embodiment of the invention is illustrated in the accompanying drawing, which shows in sectional side elevation the preferred general arrangement of a tandem master cylinder adapted for feeding two independent hydraulic circuits, for example the brakes on the two rear wheels and the brakes on the two front wheels of a motor vehicle.

A common cylinder barrel 10 forms the body of the master cylinder, and is fitted at one end with a head portion 11 secured by means of a screw thread 12, said head portion 11 being provided with a delivery valve 13 communicating with an outlet union 14 serving one of the independent hydraulic systems through a pipe 15.

At the other end of the cylinder barrel 10 a master piston 16 is arranged to be actuated by external means (not shown) through the medium of a push rod 17 having a head 18, a collapsible boot 19 being fitted to prevent the ingress of dirt and moisture to the working parts of the master cylinder.

The working space of the cylinder barrel 10 is divided into two working spaces 20 and 21 by means of an intermediate floating piston member 22, which as will be seen comprises a body formed at its head portion with a flange 23 which fits slidably in the cylinder barrel 10 and is engaged by a piston cup packing 24 adapted to prevent the passage of liquid out of the working space 21. On the other hand, during retracting movement of the floating piston 22 liquid is allowed to pass the outside of the cup 24, and for this purpose a series of holes 25 is provided in the flange 23. The intermediate part of the floating piston 22 is of reduced diameter so as to provide an annular passage 26 which normally communicates with an inlet chamber 27 through a passage 28 in the well known manner, a breathing aperture 29 being also formed in the cylinder barrel 10 just in advance of the cup 24. At its tail portion the floating piston 22 is also formed with a radial flange 30 fitting a cylinder barrel 11, and engaging a piston cup packing 31 resisting the passage of fluid out of the working space 20 and virtually constituting a cylinder head of said space. At the same time the flow of fluid in the opposite direction, i. e. from the annular space 26 to the working space 20 is prevented by a flexible packing ring 32 having an inwardly directed flange which is anchored in a groove 33 formed in thhe tail part of the floating piston 22.

The working space 20 is provided with its own delivery valve indicated at 34, while an inlet chamber 35 with associated passages 36 and 37 are identical with the corresponding parts 27, 28 and 29 of the working space 21. In the arrangement shown the delivery valve 34 communicates by way of a banjo connection 38 with a pipe 39 serving the second independent system, and in the usual motor car braking system the pipe 39 is connected with the cylinders of the front wheel brakes, while the pipe 15 passes to the cylinders of the rear wheels.

For feeding the inlet chambers 27 and 35 separate reservoirs should be used, and in the arrangement illustrated a main casing 40 is provided with a filler 41 and a union 42 feeding by means of a pipe 43 under gravity pressure into the inlet chamber 27. An inner reservoir 44, open at its upper part, is fitted with an independent union 45 by which it is anchored within the main casing 40, and which communicates by way of a pipe 46 with the inlet chamber 35 for feeding the working space 20. When working fluid is poured into the filling aperture of the outer casing 40, a certain proportion normally enters the inner reservoir 44, but in any case the latter must inevitably receive fluid if the casing 40 is filled to a level above the rim 47 of the reservoir 44.

Reverting now to the mechanical features of the tandem master cylinder it will be seen that two return springs 48 and 49 are provided within the working space 21 and bear upon a perforated abutment plate 50, while their other ends engage with a metal plate 51 shaped to clear the recessed portion of the cup 24, thus in effect tending to return the floating piston 22 to its retracted position as shown in the drawing. To limit this movement a stop screw 52 extends radially into the cylinder barrel 10 and thus engages behind the flange 23. In order to return the master piston 16 to its retracted position a spring 53 is provided in the working space 20, and as this spring is only equal in strength to the outer spring 48 it will be seen that the force exerted by the spring 49 is unopposed and always tends to move the floating piston 22 into its retracted position against the stop 52.

In order to limit the permissible volumetric contraction of the working space 20, the master piston 16 is fitted with an axial abutment 54 having a spigot 55 which is a force fit into a hole bored in the end of the master piston 16. Thus the abutment 54 is fairly readily removable, and this enables the correct length of abutment to be readily fitted so as to suit the particular braking system which the working space 20 is required to operate. Similar abutment members 56 and 57 of suitable length are also fitted to the tail end head respectively of the floating piston 22, the end of the abutment 56 being adapted to engage with the abutment 54 when the maximum contraction of the working space 20 has taken place, while the free end of the abutment 57 is arranged to engage the plate 50 for correspondingly limiting the contraction of the working space 21. The piston cup packings 24 and 31 are provided each with a central tubular portion 58 tightly embracing the corresponding abutment members for the purpose of preventing leakage of fluid, while a similar packing 59 associated with the master piston 16 in the normal manner is similarly shaped to embrace the abutment 54.

In the normal operation of the master cylinder the working spaces 20 and 21 are completely filled with fluid from the reservoirs 44 and 40 respectively, and when a force is applied to the push rod 17 the master piston 16 is moved along the cylinder barrel 10 so that the cup 59 first covers the breathing aperture 37. Thereafter, fluid pressure is built up in the working space 20 and the hydraulic system associated therewith, but this fluid pressure also acts upon the tail end of the floating piston 22, thus overcoming the comparatively slight pressure of the springs 48 and 49 and causing endwise movement of said piston 22. After the breathing aperture 29 has been covered by the cup 24 pressure also is built up in the working space 21, thus actuating the brakes or equivalent connected to the pipe 15. In normal use, therefore, the pressure intensities in the two working compartments 20 and 21 are approximately equal and are derived from the whole of the force exerted upon the push rod 17, although, of course, the movement of the rod 17 is divided between the two compartments 20 and 21, thus accounting for the whole of the power absorbed by the two systems associated with said working spaces 20 and 21, neglecting frictional losses.

Assuming now that severe leakage of fluid takes place in the system associated with the working space 20, due for example to breakage in one of the pipe lines, this will mean that there will be a reduced resistance to contraction in the working space 20, so that the initial movement of the push rod 17 will be largely absorbed in the working space 20, the low pressure intensity therein created being insufficient to cause much movement of the floating piston 22. After the maximum proscribed contraction has taken place, however, in the working space 20 the abutment 54 contacts with the pipe member 56, thus applying a positive mechanical force to the floating piston 22 and enabling the requisite pressure intensity to be built up in the working space 21. It will be realized that this working pressure in the space 21 is practically the same as would normally be obtained for any particular force applied to the push rod 17.

It will be seen that the same effect takes place if there is loss in pressure resistance within the working space 21, but in this case any attempt to build up pressure in the working space 20 will only have the effect of moving the floating piston 22 along the barrel until the abutment 57 coacts with the plate 50. Thereafter further movement of the floating piston 22 is prevented so that subsequent progress of the push rod 17 can build up the normal pressure intensity in the working space 20.

The improved form of system is, of course, readily applicable to hydraulic controlling systems of many kinds, such for example as those used for controlling the various components of aircraft, as well as the operating means for vehicle braking systems. The component parts may, moreover, be designed in accordance with standard practice, suitable provision being made for feeding the systems with liquid and permitting breathing, while it may be desirable in some cases to provide valves or other members adapted to interconnect some or all of the individual control branches when a predetermined pressure distribution occurs in the system as a whole or in a particular part thereof.

What we claim to be new is:

A tandem master cylinder unit for actuating a plurality of independent hydraulic systems comprising a cylinder barrel having a uniform bore closed at one end, an externally actuated master piston slidable in the other end, a floating piston disposed intermediate the master piston and the closed end, coiled compression springs disposed on each side of the floating piston and acting to return both of said pistons to their inoperative positions, a stop member carried by one of the pistons so as to come into contact with the other piston and so provide an abutment for mechanically transmitting force from the master piston to the floating piston, only when the maximum allowable reduction has taken place in the working space between the two pistons, an annular groove formed in the floating piston, and a stop provided on the cylinder barrel engaging said groove for the purpose of limiting the movement of said floating piston and determining its inoperative position.

GEOFFREY VAN VESTRAUT.
FRANK GORDON PARNELL.